(12) United States Patent
Sung et al.

(10) Patent No.: US 9,009,151 B2
(45) Date of Patent: Apr. 14, 2015

(54) METHOD, SYSTEM, AND COMPUTER-READABLE RECORDING MEDIUM FOR SHARING A RESULT RELATED TO CONTENTS

(75) Inventors: Young Hwan Sung, Anyang-si (KR); Hyun Jung Kim, Seongnam-si (KR); Mi Jin Kwon, Seoul (KR); Eun Lee Kim, Seoul (KR)

(73) Assignee: NHN Entertainment Corporation, Seongnam-si (KR)

( * ) Notice: Subject to any disclaimer, the term of this patent is extended or adjusted under 35 U.S.C. 154(b) by 725 days.

(21) Appl. No.: 12/644,770

(22) Filed: Dec. 22, 2009

(65) Prior Publication Data

US 2010/0161598 A1      Jun. 24, 2010

(30) Foreign Application Priority Data

Dec. 22, 2008    (KR) ......................... 10-2008-0131547

(51) Int. Cl.
*G06F 17/30*      (2006.01)

(52) U.S. Cl.
CPC ................................ *G06F 17/30893* (2013.01)

(58) Field of Classification Search
CPC ....................... G06F 17/3089; G06F 17/30893
USPC ........................................ 705/319; 707/731
See application file for complete search history.

(56) References Cited

U.S. PATENT DOCUMENTS

| 2007/0073667 A1* | 3/2007 | Chung ............................. 707/3 |
| 2008/0040673 A1* | 2/2008 | Zuckerberg et al. .......... 715/745 |
| 2010/0049534 A1* | 2/2010 | Whitnah et al. .................. 705/1 |
| 2010/0114788 A1* | 5/2010 | White et al. .................. 705/319 |
| 2010/0138775 A1* | 6/2010 | Kohen et al. .................. 715/781 |

FOREIGN PATENT DOCUMENTS

| JP | 2002-258744 | 9/2002 |
| JP | 2007-536954 | 12/2007 |
| WO | 2005/106729 | 11/2005 |

* cited by examiner

*Primary Examiner* — James Trujillo
*Assistant Examiner* — Grace Park
(74) *Attorney, Agent, or Firm* — H.C. Park & Associates, PLC

(57) ABSTRACT

The present invention relates to a method, system, and computer-readable recoding medium for sharing a result related to contents. The method for sharing a result related to contents includes the steps of assigning different identifications (IDs) to communities in which the contents are primarily and/or secondarily posted if a user requests to directly scrap and post the contents of a server, and collectively providing a result created in relation to the contents belonging to communities having a common ID if the result is created in relation to the primarily and/or secondarily posted contents.

18 Claims, 6 Drawing Sheets

METHOD, SYSTEM, AND COMPUTER-READABLE RECORDING MEDIUM FOR SHARING A RESULT RELATED TO CONTENTS

CROSS REFERENCE TO RELATED APPLICATION

This application claims priority from and the benefit of Korean Patent Application No. 10-2008-0131547, filed on Dec. 22, 2008, which is hereby incorporated by reference for all purposes as if fully set forth herein.

BACKGROUND OF THE INVENTION

1. Field of the Invention

Exemplary embodiments of the present invention relate to a method, system, and computer-readable recoding medium for sharing a result related to contents.

2. Discussion of the Background

Internet users may form online communities for interacting with other users. Geographic communities such as villages or cities, demographical communities such as female groups, male groups, or races, and/or subjective communities such as groups of users having the same hobbies or fan clubs now have corresponding online communities that can be represented in Internet communities such as net cafés, blogs, and social networking sites.

An operator can apply to an Internet service provider to open an Internet community. Users interested in joining a community opened in this manner can apply for joining the community as a member. Accordingly, the operator and other users/members can form a community.

Internet communities typically provide mailing lists, message boards, real-time chatting, and/or contents to vitalize and advertise their communities and persuade a plurality of users/members to participate or join the communities to expanding the membership and the network of their respective communities.

Contents such as games or moving images are typically the most efficient method to share information in a community. A ranking of a user/member in a community can be calculated based on points scored by playing a game or a number of users recommending a comment related to a moving image. Accordingly, members of the same community can engage in effective competition.

However, Internet communities, as the one described above, may have a high communication barrier with the other communities. For example, a user/member of one community may not be able to share a result related to contents with users/members of other communities. Accordingly, the range of user/member activities in an Internet community is limited, and therefore advertising contents may have low efficiency in an Internet community.

SUMMARY OF THE INVENTION

Exemplary embodiments of the present invention provide a method to share a result (e.g., ranking) related to contents among communities.

Exemplary embodiments of the present invention also provide a method to remove barriers between communities by sharing a result related to contents with members of other communities.

Additional features of the invention will be set forth in the description which follows, and in part will be apparent from the description, or may be learned by practice of the invention.

Exemplary embodiments of the present invention disclose a method of sharing a result related to contents. The method includes receiving, from a terminal device, a first user request to directly scrap and/or post a content, and assigning, in response to receiving the first user request, a first identification (ID) to a community primarily posting the content. The method further includes receiving a second user request to directly or indirectly scrap and/or secondarily post the content in a second community, and assigning, in response to receiving the second user request, a second ID to the second community. The method further includes providing, to one or more communities having a common ID and having posted or scrapped the content, results in response to executing the content.

Exemplary embodiments of the present invention also disclose a system for sharing a result related to contents. The system includes an identification (ID) assigning unit and a contents result collecting unit. The ID assigning unit assigns a first ID to a community primarily posting a content in response to receiving a first user request to directly scrap and/or post the content. The ID assigning unit assigns a second ID to a second community in response to receiving a second user request to directly or indirectly scrap and/or secondarily post the content in the second community. The contents result collecting unit provides a result to one or more communities having a common ID and having posted or scrapped the content. The result is provided in response to execution of the content.

Exemplary embodiments of the present invention also disclose a non-transitory computer-readable medium comprising an executable program which, when executed, performs a method. The method includes receiving, from a terminal device, a first user request to directly scrap and/or post a content, and assigning, in response to receiving the first user request, a first identification (ID) to a community primarily posting the content. The method further includes receiving a second user request to directly or indirectly scrap and/or secondarily post the content in a second community, and assigning, in response to receiving the second user request, a second ID to the second community. The method further includes providing, to one or more communities having a common ID and having posted or scrapped the content, results in response to executing the content.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DESCRIPTION OF THE ILLUSTRATED EMBODIMENTS

Figure 1:
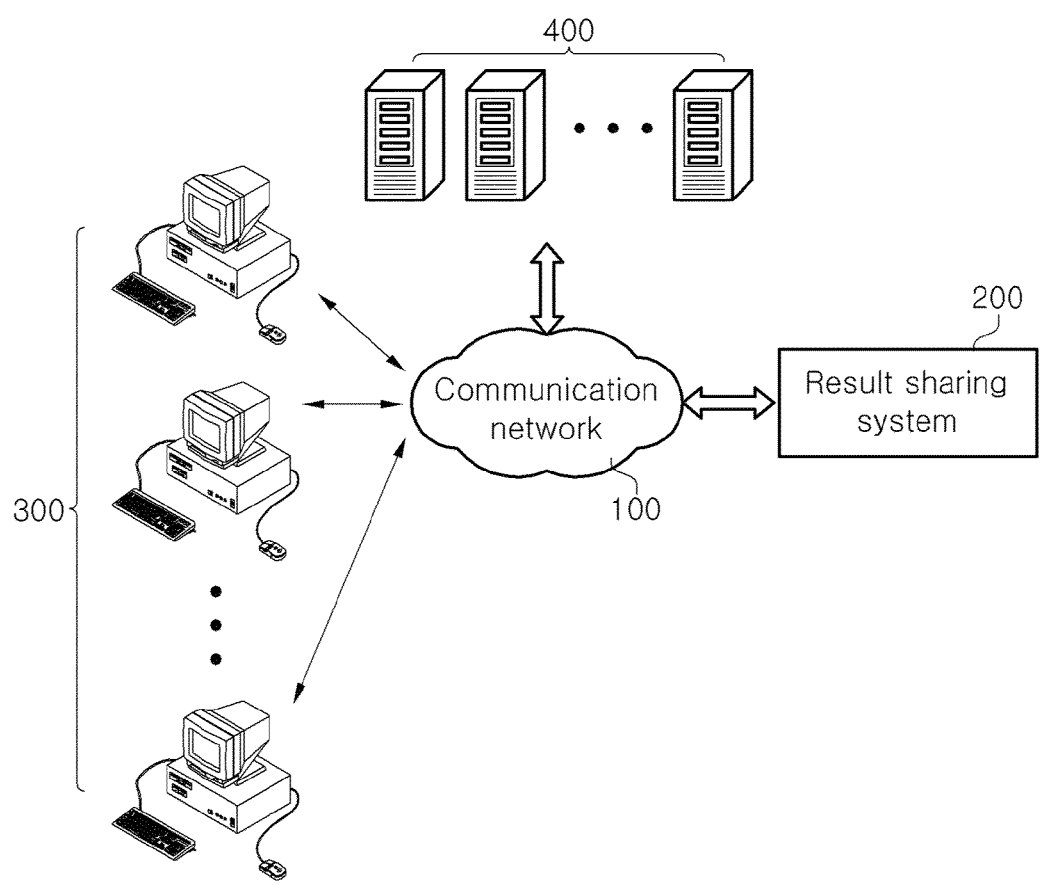
FIG. 1 is a view showing a schematic configuration of a system for sharing, with a plurality of communities, a result related to a content according to exemplary embodiments of the present invention.

In the following detailed description of the present invention, references are made to the accompanying drawings that show, by way of illustration, specific exemplary embodiments in which the invention may be practiced. These exemplary embodiments are described in sufficient detail to enable those skilled in the art to practice the present invention. It is to be understood that the various exemplary embodiments of the invention, although different from each other, are not necessarily mutually exclusive. For example, specific configurations, structures, and features described herein, in connection with one exemplary embodiment, may be implemented within other exemplary embodiments without departing from the spirit and scope of the invention. In addition, it is to be understood that the location or arrangement of individual elements within each disclosed exemplary embodiment may be modified without departing from the spirit and scope of the invention. The following description is, therefore, not construed to limit the scope of the present invention. In the drawings, like reference numerals refer to like elements having the same or similar functionality.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Prior to explaining exemplary embodiments of the present invention, relevant terminology will be defined for the description below.

"Contents," may refer to scrapped or posted data related to a game, text, images, flashes, and/or moving images.

A "result created in relation to contents" may refer to information on a ranking calculated based on a score of playing games. The result created in relation to contents can also include a number of comments describing a user/member's feelings regarding a text, image, flash or moving image, and/or rankings of recommendations on the comments.

A "community" may refer to a space (e.g., web space) in which a plurality of users/members can interact with one another, such as a café, blog, or a social networking site on the Internet. A community may also refer to a web space where a single user/member performs an activity. Examples of a community include, for example, Naver café, Daum café®, Naver blog, CyWorld®, Me2Day, Facebook®, Myspace®, Twitter®, LinkedIn®, Hi5®, Mixi®, YouTube®, and Google Wave®. The community is not limited to an online meeting where users/members having common hobbies and interests meet and share information. The community can include concepts such as a social network service (SNS), which is an online networking service for users/members to, for example, extend friendships and network with other users/members.

Hereinafter, exemplary embodiments of the present invention will be described in detail with reference to the accompanying drawings so that those skilled in the art can easily practice the present invention.

FIG. 1 is a view showing a schematic configuration of a system for sharing, with a plurality of communities, a result related to contents according to an exemplary embodiment of the present invention.

Referring to FIG. 1, a system may include a communication network 100, a result sharing system 200, a user/member terminal device 300, and a web server 400.

The communication network 100 may be configured for wired or wireless communications and can be implemented as any suitable communication network, for example, a local area network (LAN), a metropolitan area network (MAN), and a wide area network (WAN). In some cases, the communication network 100 may be the world wide web (WWW).

The result sharing system 200 may assign, according to a rule, an identity (ID) is related to contents to each community that scraps and posts contents. For example, a first community can directly scrap and post (e.g., primary posting) contents stored in the web server 400. A second community may directly or indirectly scrap and post (e.g., secondary posting) the same contents. Different IDs can be assigned to respective communities that primarily post contents. The first community and the second community can be assigned the same ID.

The result sharing system 200 may analyze the IDs assigned to respective communities and may collectively provide results (e.g., ranking obtained by executing the contents) related to contents posted in communities having an ID that is the same as the ID assigned in relation to contents displayed on a terminal device 300.

The terminal device 300 may be a digital device having a function allowing a user/member to connect to and communicate with the result sharing system 200 and/or the web server 400. The terminal device 300 may be any digital device implemented with a memory means and a microprocessor. Examples of a terminal device 300 include, for example, a desktop computer, a notebook computer, a workstation, a Personal Digital Assistant (PDA), a web pad, and a cellular phone. The terminal device 300 may be operated by the user/member and may include a web browser (not shown) program for receiving and displaying community services.

If a result related to the contents is created by executing the contents posted in the community, the terminal device 300 may transmit and store the result in the result sharing system 200 according to the corresponding ID. In some cases, the result sharing system 200 may collect only the results created in relation to the contents of the communities having the same ID and may provide the terminal device 300 with the collected results.

The web server 400 may include an operating server of an Internet search portal site communicating with the result sharing system 200 and/or the terminal device 300. The web server 400 may store contents (e.g., games, images, and moving images) and provide the terminal device 300 with community services, such as, for example, Internet-based cafes, blogs, and social networking sites.

Although the result sharing system 200 and the web server 400 are illustrated separately in FIG. 1, the result sharing system 200 may be included in the web server 400.

Hereinafter, the internal configuration of the result sharing system 200 will be described with reference to FIG. 2.

Figure 2:
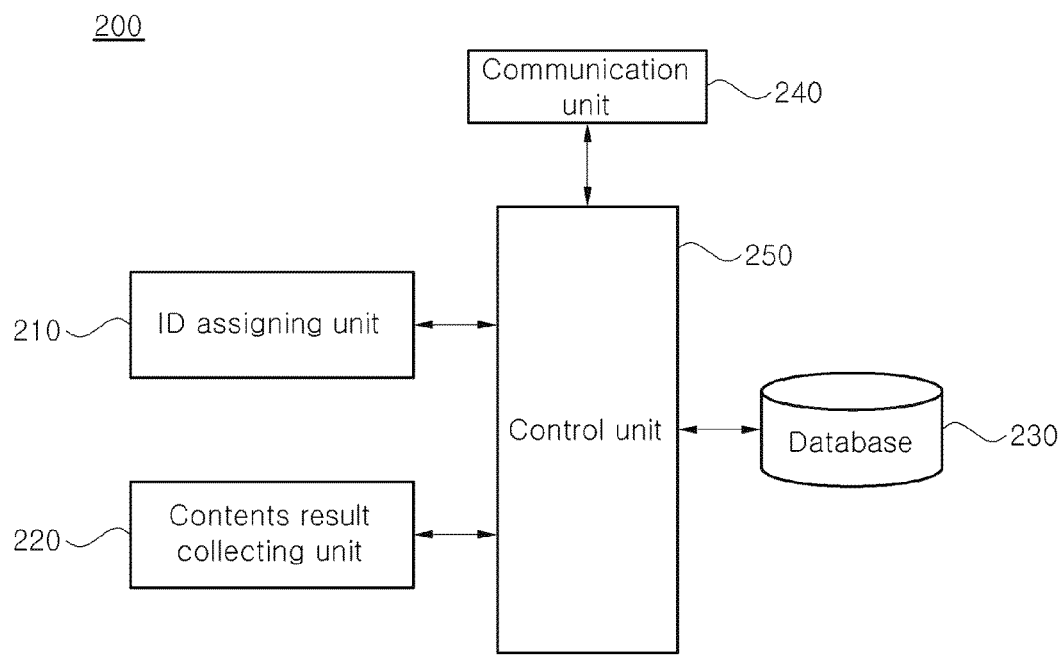
FIG. 2 is a view showing an internal configuration of a result sharing system according to exemplary embodiments of the present invention.

FIG. 2 is a view showing an internal configuration of a result sharing system according to exemplary embodiments of the present invention.

Referring to FIG. 2, the result sharing system 200 may include an ID assigning unit 210, a contents result collecting unit 220, a database 230, a communication unit 240, and a control unit 250.

The terminal device 300 may communicate with program modules in the ID assigning unit 210, the contents result collecting unit 220, the database 230, the communication unit 240, and/or the control unit 250. The program modules may be included in the result sharing system 200 in the form of an operating system, an application program module, or other program modules, and may be physically stored in any suitable memory device. For example, the program modules can be stored in a remote memory device capable of communicating with the result sharing system 200. The program modules may include, but are not limited to, routines, subroutines, programs, objects, components, and/or data structures for performing a specific task or for executing a specific abstract data type.

The ID assigning unit 210 may assign an ID to each community that scraps and posts contents.

For example, if a request for scrapping contents in a specific web server 400 and primarily posting contents in one or more communities is received from the terminal device 300, the ID assigning unit 210 may assign different IDs to respective communities primarily posting the contents.

Subsequently, if a request for directly or indirectly scrapping the contents posted in a first community and a request for secondarily posting the contents in a second community are received from the terminal device 300, the ID assigning unit 210 may assign the same ID to the first and second communities.

Next, if a user/member executes the contents through the terminal device 300 and creates a result related to the primarily and/or secondarily posted contents, the contents result collecting unit 220 may collect the result related to the contents and provide members of the first and second communities having the same ID with the collected result.

Accordingly, as described in further detail with reference to FIG. 3, a network of communities related to one another can be created by grouping together communities with the same IDs.

The database 230 may store a contents identifier, a community identifier, IDs assigned to each community, information associated with a result related to contents, and information associated with scrapping contents.

Database 230 may be included in the result sharing system 200, as shown in FIG. 2, or may be provided separate from the result sharing system 200. The database 230 may be a computer-readable recording medium, and may include various types of databases of a wide sense, such as data recordings based on a file system, as well as databases of a narrow sense, such as an integrated collection of logically related records consolidated into a common pool that provides data for one or more multiple uses, and that is made and operated by a certain software called DBMS (DataBase Management Software). If data is searched for and extracted, a simple set of logs may also be included in the database 230 in a wide sense.

The communication unit 240 may allow the result sharing system 200 to communicate with an external device, such as the terminal device 300 and/or the web server 400. The communication unit 240 may employ any suitable communications scheme to transmit and receive data.

The control unit 250 may control data flow between the ID assigning unit 210, the contents result collecting unit 220, the database 230, and the communication unit 240. The control unit 250 may control data flow received from external components, such as the terminal device 300, or data flow between the components of the result sharing system 200.

Hereinafter, an example of an ID assigned according to the operation of scrapping contents and an example of sharing result information related to the contents is described.

Figure 3:
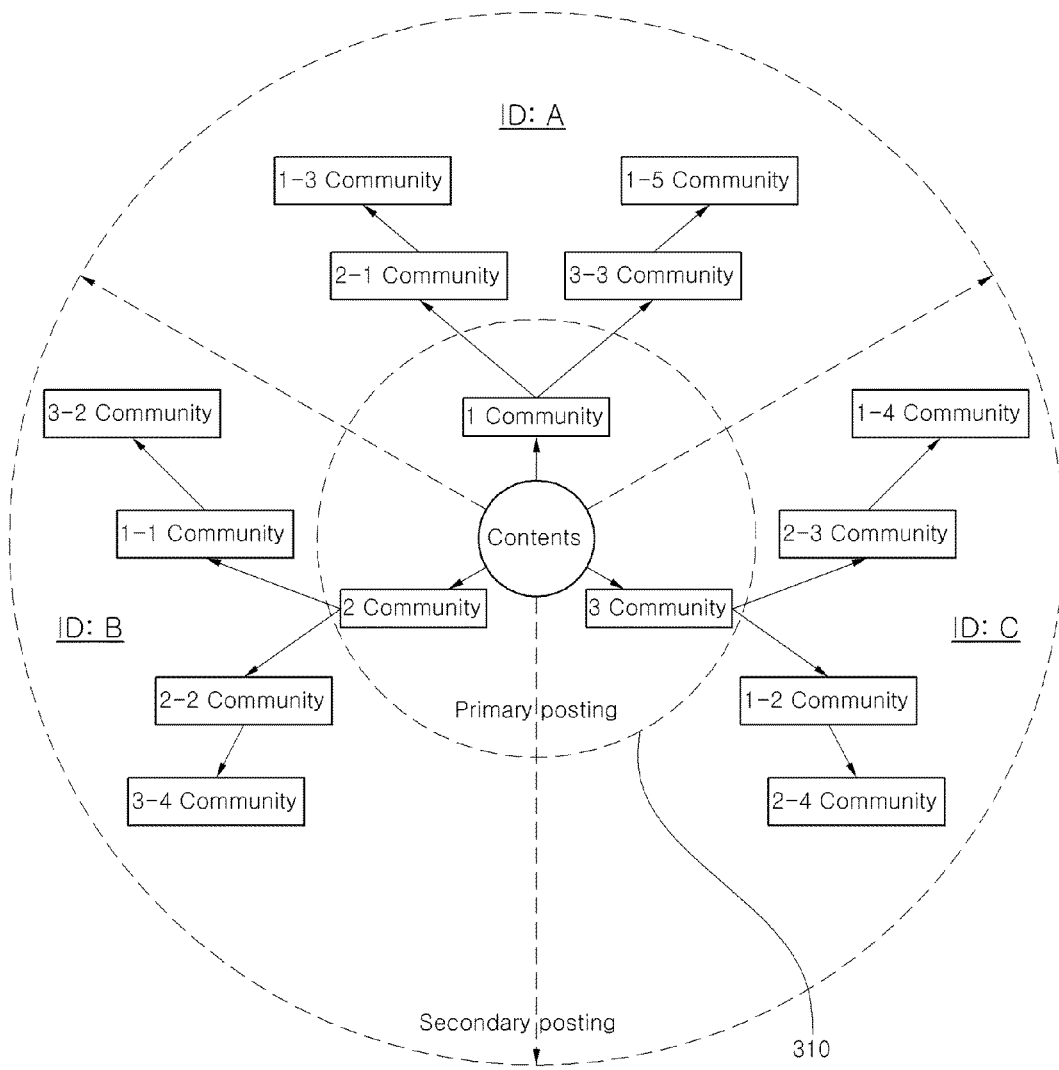
FIG. 3 is a view showing an example of assigning an identity to a community through a contents scrapping operation according to exemplary embodiments of the present invention.

FIG. 3 is a view showing an example of assigning an ID to a community through a contents scrapping operation according to exemplary embodiments of the present invention.

The 'contents' positioned at the center of the circle shown in FIG. 3 may be, for example, contents stored in the web server 400. Arrows pointing towards each community may represent a state of performing an operation of scrapping the contents in the respective communities.

Referring to FIG. 3, a primary posting may be accomplished in communities shown in area 310 after contents stored in the web server 400 are directly scrapped. A secondary posting may be accomplished in a community existing outside of area 310 after contents are directly or indirectly scrapped from a community primarily posting the contents.

Different IDs may be assigned to the communities posting the contents. For example, an ID 'A' can be assigned to community 1 primarily posting the contents.

Next, the contents may be directly scrapped from community 1 and secondarily posted in community 2-1 and community 3-3. As shown in FIG. 3, ID 'A' may also be assigned to community 2-1 and community 3-3.

Subsequently, the contents may be further scrapped in community 2-1 and community 3-3 (i.e., indirectly scrapping the contents posted in community 1) and may be posted in community 1-3 and community 1-5 (also referred to as a secondary posting). ID 'A' may also be assigned to community 1-3 and community 1-5.

Accordingly, ID 'A' can be assigned to community 1 and any other communities (e.g., communities 1-3, 1-5, 2-1, and 3-3) that directly or indirectly scrap and post (e.g., secondary posts) the contents from community 1. Accordingly, a community group having a common ID can be formed. Therefore, a plurality of communities can share a result related to contents.

IDs 'B' and 'C' may be assigned to community 2 and community 3 to create community groups having common IDs, as described above. The community groups can share results related to contents.

Figure 4A:
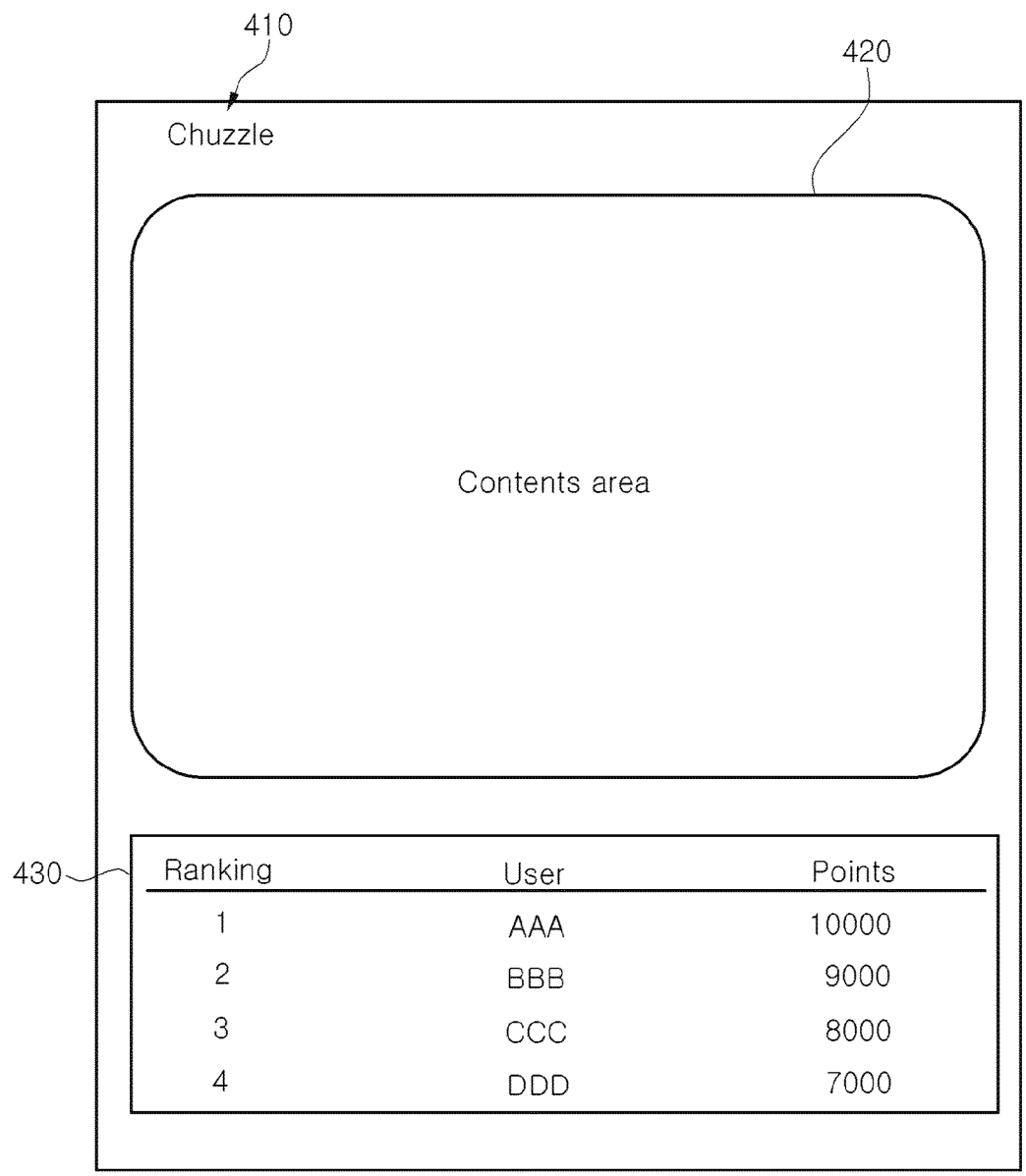
FIG. 4A is an interface screen showing an example of sharing, with a plurality of communities, a result related to contents according to exemplary embodiments of the present invention.

FIG. 4A is an interface screen showing an example of sharing, with a plurality of communities, a result related to contents according to exemplary embodiments of the present invention.

Referring to FIG. 4A, a contents title 410 may be, for example, 'Chuzzle,' which can be displayed in an upper portion of the interface screen. A contents area 420 for displaying contents such as, for example, a game, image, and moving image, may be positioned in a middle portion of the screen, or in general, in any suitable location of the screen. In addition, a result display section 430 for providing information on a result related to contents may be positioned in a lower portion of the screen. The contents may be contents posted in a community to which an ID is assigned, as described above with reference to FIG. 3. Ranking information of users belonging to communities having the same ID may be displayed according to a points ranking in the result display section 430. For example, a user/member 'AAA' may be ranked first because of having a highest points total of, for example, '10,000' among all the users/members belonging to the communities having the same ID.

Figure 4B:
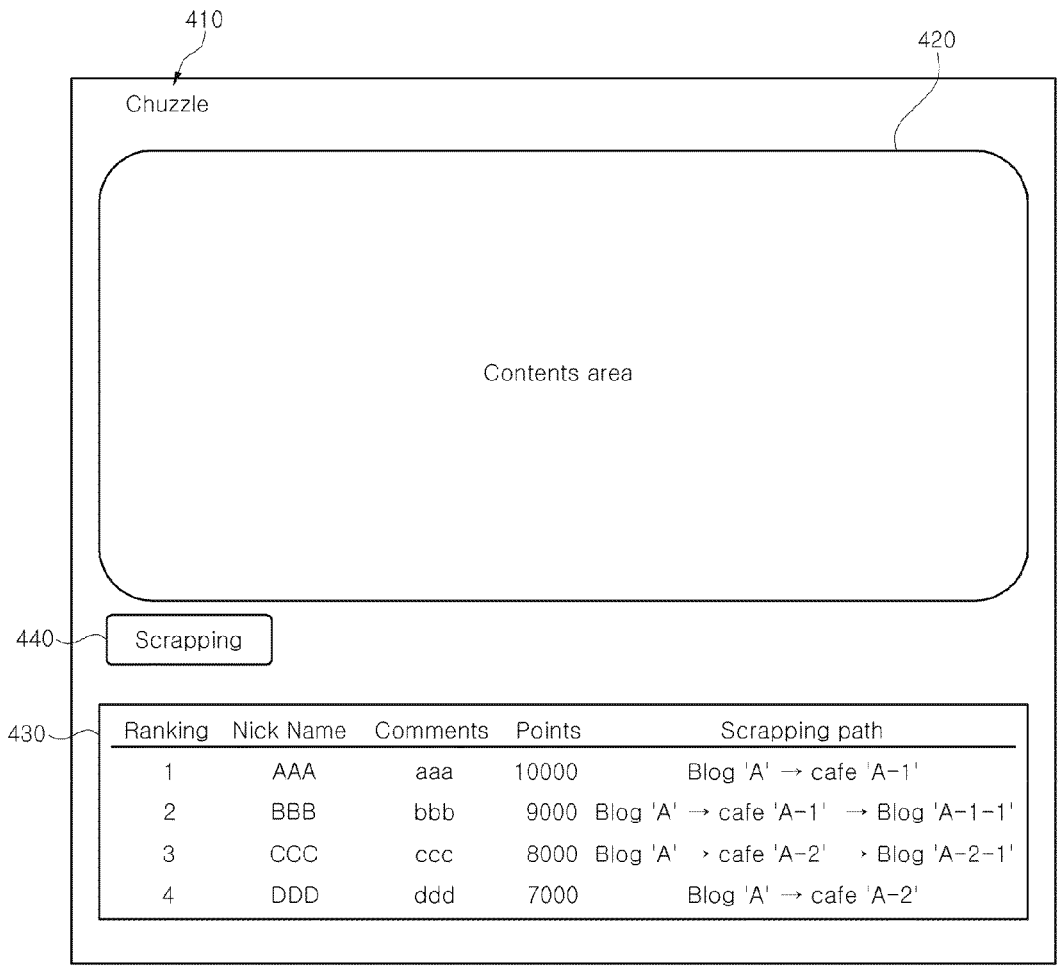
FIG. 4B is an interface screen showing another example of sharing, with a plurality of communities, a result related to contents according to exemplary embodiments of the present invention.

FIG. 4B is an interface screen showing another example of sharing, with a plurality of communities, a result related to contents according to exemplary embodiments of the present invention.

Referring to FIG. 4B, a contents title 410 may be, for example, 'Chuzzle,' which can be displayed in an upper portion of the interface screen. A contents area 420 for displaying contents such as, for example, a game, image, and moving image, may be positioned in a middle portion of the screen, or in general, in any suitable location of the screen. In addition, a result display section 430 for providing information on a result related to the contents may be positioned in a lower portion of the screen. The interface screen illustrated in FIG. 4B may also include a Scrapping button 440. A user/member's comments related to contents and additional user/member nick names can be displayed in the result display section 430 of the screen, along with the ranking information based on points (score), as described above. In addition, information on the scrapping (directly or indirectly) path along which the operation of directly and indirectly scrapping the contents has been performed may be displayed in the result display section 430. If a portion or path of the path information is selected, a contents screen belonging to a corresponding community may be displayed.

For example, a user/member 'AAA' may have '10,000' points. The user/member may write a comment 'aaa.' Path information for user/member 'AAA' can be "Blog 'A'→café 'A-1'," as shown in FIG. 4B. If blog 'A' is selected from the path information, the contents screen posted in blog 'A' can be displayed, and activities of users/members playing, for example, a game associated with blog 'A' can be displayed on the screen.

As described above, the ID assigning unit 210 may automatically assign an ID to a community based on contents. A user/member may also be provided with an interface to select an ID for a community the user/member belongs to. For example, if the user/member presses the scrapping button 440 shown in FIG. 4B, a window may be displayed. Using the window, the user/member may select whether to scrap contents while maintaining the ID assigned to the community posting the contents or to scrap the contents and change the ID when the user/member scraps the contents. If the user/member selects to scrap the contents and assign a different ID, the contents result collecting unit 220 may ignore ranking information existing in relation to first communities on the scrapping path and may collect new ranking information.

Figure 5:
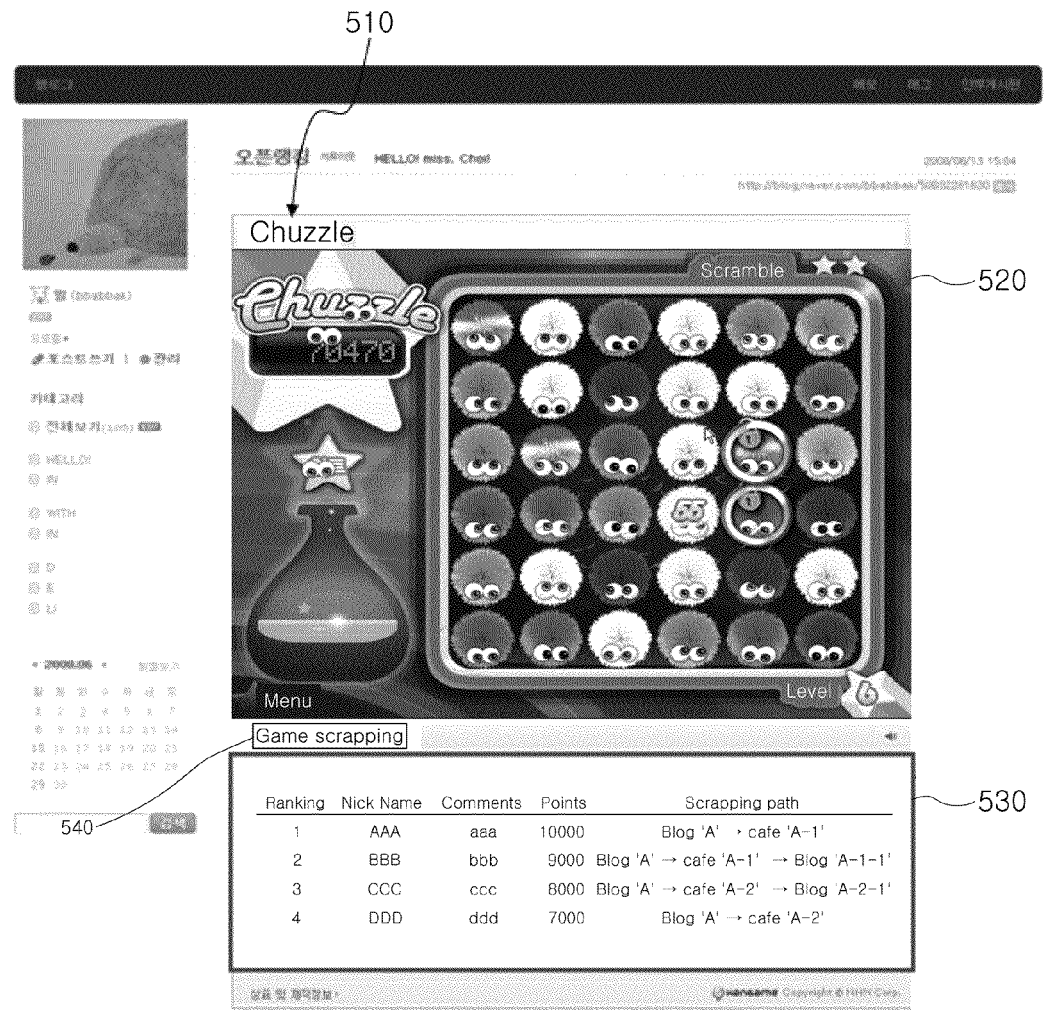
FIG. 5 is an interface screen showing an example of sharing a result related to a flash game in a blog according to exemplary embodiments of the present invention.

FIG. 5 is an interface screen showing an example of sharing a result related to a flash game in a blog according to exemplary embodiments of the present invention.

Referring to FIG. 5, a flash game called "Chuzzle" 510 can be displayed in an upper portion of a screen, and a flash game corresponding to 'Chuzzle' may be displayed in a contents area 520. Ranking information of a plurality of users/members who have played the flash game is collected and provided through a result display section 530 in a lower portion of the screen. The flash game may be posted in communities having the same ID, which may correspond to an ID of a corresponding blog.

Accordingly, since users/members belonging to different communities may compete for contents in an open (shared) state, utilization of contents-based communities can be enhanced, and community integration can be accomplished by removing barriers between various communities.

The aforementioned exemplary embodiments of the invention can be implemented in the form of a program command that can be executed through a variety of components of a computer and recorded in a computer-readable medium. The computer-readable medium may store program commands, data files, and/or data structures in an independent or combined form. The program command recorded in the computer-readable medium may be a command designed to implement exemplary embodiments of the present invention or a command, publicized to and used by those skilled in a computer software field. The computer-readable medium may include, for example, magnetic media such as a hard disk, a floppy disk, a magnetic tape, an optical recording media such as CD-ROM and DVD, magneto-optical media, and a hardware device, such as ROM, RAM, and flash memory, specially constructed to store and execute a program command. The program command may include, for example, high-level language codes that can be executed by a computer using an interpreter, as well as machine language codes created by a compiler. The hardware device may be constructed to operate as one or more software modules in order to perform the processing according to exemplary embodiments of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for sharing a result related to contents, the method comprising:
   receiving, from a terminal, a first request to directly scrap and post a first content;
   assigning, in response to receiving the first request, a first identification (ID) to a first community primarily posting the first content;
   receiving a second request to directly or indirectly scrap and post content in a second community;
   assigning, in response to receiving the second request, a second ID to the second community; and
   providing, to communities having the same ID comprising the first ID, a collective result in response to executing the first content,
   wherein the second ID is the same as the first ID when the content posted in the second community comprises a secondarily posted first content, and
   wherein the second ID is different than the first ID when the content posted in the second community comprises a primarily posted content.

2. The method of claim 1, wherein providing a result comprises providing the result comprising information associated with a ranking of users, the rankings being based on the first content, and
   wherein the second ID is the same as the first ID.

3. The method of claim 2, wherein if the first content is associated with a game, the result comprises information associated with a ranking of points of the users who participate in the game.

4. The method of claim 1, wherein the first community and the second community comprise a social network service (SNS).

5. The method of claim 1, wherein the result comprises at least one or more of an identification of a user, a comment of a user, and a score of a user.

6. The method of claim 5, wherein the result further comprises path information associated with a virtual path indicating a path of the user to post the first content.

7. The method of claim 6, further comprising displaying, on the terminal, a contents screen associated with a community corresponding to the path information in response to selection of at least a portion of the path by the user.

8. The method of claim 1, further comprising providing a user interface for assigning an ID different than the first ID to a community where the first content is secondarily posted if the second request for scrapping and posting the content is received from the terminal.

9. A system for sharing a result related to contents, the system comprising:
   a processor configured to control an identification (ID) assigning unit to assign a first ID to a first community primarily posting a first content in response to receiving a first request to directly scrap and post the first content, and to assign a second ID to a second community in response to receiving a second request to directly or indirectly scrap and content in the second community,
   wherein the processor is configured to control a contents result collecting unit to provide a collective result to communities having the same ID comprising the first ID, the result being provided in response to execution of the first content,
   wherein the second ID is the same as the first ID when the content posted in the second community comprises a secondarily posted first content, and
   wherein the second ID is different than the first ID when the content posted in the second community comprises a primarily posted content.

10. The system of claim 9, wherein the result comprises information associated with a ranking of users, the ranking being based on the first content, and
   wherein the second ID is the same as the first ID.

11. The system of claim 10, wherein if the first content is associated with a game, the result comprises information associated with a ranking of points of the users who participate in the game.

12. The system of claim 9, wherein the first community and the second community comprises a social network service (SNS).

13. The system of claim 9, wherein the contents result collecting unit is configured to provide the result comprising at least one or more of an identification of a user, a comment of a user, and a score of a user as the result created in relation to the first content.

14. The system of claim 13, wherein the contents result collecting unit is further configured to provide path information associated with a virtual path indicating a path of the user to post the first content.

15. The system of claim 14, wherein a contents screen associated with a community corresponding to the path information is displayed on a terminal in response to selection of at least a portion of the path by the user.

16. The system of claim 9, further comprises a user interface for assigning an ID different than the first ID to a community where the first content is secondarily posted if the second request for scrapping and posting the content is received from the terminal.

17. A non-transitory computer-readable medium comprising an executable program which, when executed, performs a method comprising:
   receiving, from a terminal, a first request to directly scrap and post a first content;
   assigning, in response to receiving the first request, a first identification (ID) to a first community primarily posting the first content;
   receiving a second request to directly or indirectly scrap and post content in a second community;
   assigning, in response to receiving the second request, a second ID to the second community; and
   providing, to communities having the same ID comprising the first ID, a collective result in response to executing the first content,
   wherein the second ID is the same as the first ID when the content posted in the second community comprises a secondarily posted first content, and
   wherein the second ID is different than the first ID when the content posted in the second community comprises a primarily posted content.

18. The method of claim 1, wherein the first request comprises a request to scrap the first content from a web server and a request to post the first content in the first community.

* * * * *